US008144011B2

(12) United States Patent
Fitzgibbon

(10) Patent No.: US 8,144,011 B2
(45) Date of Patent: Mar. 27, 2012

(54) ALARM SYSTEM INTERACTION WITH A MOVABLE BARRIER OPERATOR METHOD AND APPARATUS

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 12/967,505

(22) Filed: Dec. 14, 2010

(65) Prior Publication Data

US 2011/0084836 A1 Apr. 14, 2011

Related U.S. Application Data

(63) Continuation of application No. 12/435,822, filed on May 5, 2009, now Pat. No. 7,852,212, which is a continuation of application No. 12/341,658, filed on Dec. 22, 2008, now Pat. No. 7,876,218, which is a continuation of application No. 11/044,928, filed on Jan. 27, 2005, now Pat. No. 7,482,923.

(51) Int. Cl.
*G08B 13/08* (2006.01)
*G08B 29/00* (2006.01)
*H04B 7/00* (2006.01)

(52) U.S. Cl. .................... 340/545.1; 340/5.71; 455/41.2

(58) Field of Classification Search ........................ None
See application file for complete search history.

(56) References Cited

U.S. PATENT DOCUMENTS

| | | | | |
|---|---|---|---|---|
| 4,408,251 | A * | 10/1983 | Kaplan | 361/172 |
| 5,565,843 | A | 10/1996 | Meyvis | |
| 5,596,840 | A | 1/1997 | Teich | |
| 5,805,064 | A | 9/1998 | Yorkey | |
| 6,127,740 | A * | 10/2000 | Roddy et al. | 307/10.1 |
| 6,131,019 | A * | 10/2000 | King | 455/99 |
| 6,346,889 | B1 * | 2/2002 | Moss | 340/686.1 |
| 6,933,843 | B1 * | 8/2005 | Hom et al. | 340/545.1 |
| 7,071,850 | B1 * | 7/2006 | Fitzgibbon et al. | 341/57 |
| 7,482,923 | B2 | 1/2009 | Fitzgibbon | |
| 7,561,075 | B2 * | 7/2009 | Fitzgibbon et al. | 341/57 |
| 7,852,212 | B2 | 12/2010 | Fitzgibbon | |
| 7,876,218 | B2 | 1/2011 | Fitzgibbon | |
| 2001/0011941 | A1 * | 8/2001 | King et al. | 340/5.64 |
| 2005/0134426 | A1 | 6/2005 | Mullet et al. | |
| 2005/0170777 | A1 * | 8/2005 | Harwood et al. | 455/41.2 |
| 2006/0077035 | A1 | 4/2006 | Mamaloukas | |
| 2006/0137261 | A1 * | 6/2006 | Maly | 52/36.3 |
| 2006/0158344 | A1 * | 7/2006 | Bambini et al. | 340/825.69 |
| 2007/0058811 | A1 * | 3/2007 | Fitzgibbon et al. | 380/268 |
| 2009/0102651 | A1 | 4/2009 | Fitzgibbon | |
| 2011/0084798 | A1 | 4/2011 | Fitzgibbon | |

OTHER PUBLICATIONS www.brinkshomesecurity.com/home-security-systems-and-pricing/security-equipment/security-equipment.htm as printed on Feb. 11, 2009.

* cited by examiner

*Primary Examiner* — Julie Lieu
(74) *Attorney, Agent, or Firm* — Fitch Even Tabin & Flannery

(57) ABSTRACT

A secure communication link (24) is provided between a movable bather operator (23) and a peripheral system (20). Information conveyed via this link is used by one, the other, or both such elements to further inform or direct their respective actions.

25 Claims, 1 Drawing Sheet

10

30

ALARM SYSTEM INTERACTION WITH A MOVABLE BARRIER OPERATOR METHOD AND APPARATUS

CROSS REFERENCE TO RELATED APPLICATIONS

This application is a continuation application of U.S. patent application Ser. No. 12/435,822 filed on May 5, 2009, now U.S. Pat. No. 7,852,212, which is a continuation application of U.S. patent application No. 12/341,658 filed on Dec. 22, 2008, now U.S. Pat. No. 7,876,218, which is a continuation application of U.S. patent application Ser. No. 11/044,928 filed on Jan. 27, 2005, now U.S. Pat. No. 7,482,923. U.S. patent application No. 12/435,822, now U.S. Pat. No. 7,852,212, and U.S. patent application No. 11/044,928, now U.S. Pat. No. 7,482,923, are hereby incorporated herein by reference in their entireties. This application is also related to U.S. patent application Ser. No. 12/971,374, filed Dec. 17, 2010.

TECHNICAL FIELD

This invention relates generally to movable barrier operators and more particularly to communications therewith.

BACKGROUND

Movable barrier operators of various kinds are known in the art. Such movable barrier operators often work in conjunction with a corresponding movable barrier such as a single panel or segmented garage door, a rolling shutter, a pivoting, swinging, or sliding gate or arm barrier, and so forth. In particular, the movable barrier operator typically responds to user inputs (often as input via a remotely located user interface) to effect selective movement of a corresponding movable barrier (for example, to transition the movable barrier back and forth between a closed and an opened position). Some movable barrier operators have additional functionality. For example, some movable barrier operators are able to control the illumination state of one or more light sources.

Alarm systems, including but not limited to intrusion detection alarm systems, are also known in the art. Such systems often serve to monitor one or more intrusion detectors and to respond to a detected intrusion with a corresponding action. Exemplary actions include sounding an audible alarm, illuminating or flashing one or more light sources, automatically sourcing a page, telephone call, or the like to notify one or more predetermined parties of the detected intrusion, and so forth.

In many cases, a building or residence having an alarm system will also have one or more movable barrier operators. There have been some prior efforts to effect communications and/or cooperation as between such elements. For example, the X10 standard has been employed to effect relatively simplistic communications (such as indicating a present status of a movable barrier to an alarm system or to permit an alarm system controller to also control activation of a movable barrier operator).

To date, such proposals are relatively simple and do not permit or facilitate much potential depth or capacity with respect to leveragable functionality. As a practical result, for the most part, little integration has occurred in the marketplace. At least one problem posed by seeking more powerful cooperation between such elements relates to increasing the likelihood that an unauthorized individual may be able to take advantage of the necessarily expanded communication link(s) as are used to support such cooperation and thereby impair or defeat the alarm system itself, the movable barrier operator, or both. Another problem reflects an apparent present perception on the part of at least some persons skilled in the art that the possible benefits of supporting such cooperation are relatively negligible in comparison to the perceived costs of implementation and risk to overall security and effectiveness.

BRIEF DESCRIPTION OF THE DRAWINGS

The above needs are at least partially met through provision of the alarm system interaction with a movable barrier operator method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a secure communication link between a movable barrier operator and a peripheral alarm system and then effects at least one communication between these elements using that secure communication link.

The secure communication link can comprise, for example, an encrypted wireless communication link, a non-wireless communication link, or the like. The communication can comprise, for example, data such as, but not limited to, an instruction to the movable barrier operator. Depending upon the needs of a given application, the peripheral alarm system can be responsive to data as is received from the movable barrier operator and/or the movable barrier operator can respond to operational instructions as are sourced by the peripheral alarm system.

Various capabilities and corresponding benefits are readily facilitated by these actions. As an illustrative example, when a given alarm system has a corresponding actuation time delay (to permit, for example, a home owner to vacate their premises prior to the alarm system arming itself), use and/or control of that actuation time delay can be further informed, controlled, or influenced by a present (or recent) operational state of a corresponding movable barrier operator. For example, the actuation time delay may be effectively lengthened (or shortened) as a function, at least in part, of whether the garage door of a home is opened, opening, closed, or closing.

Figure 1:
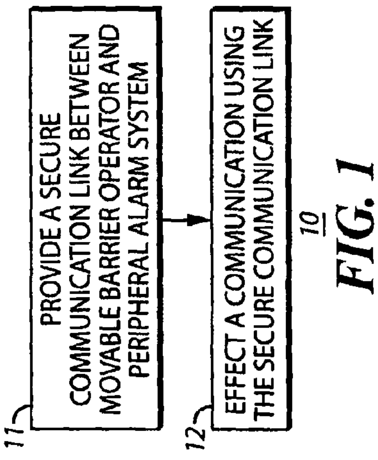
FIG. 1 comprises a flow diagram as configured in accordance with various embodiments of the invention.

These and other benefits may become clearer upon making a thorough review and study of the following detailed description. Referring now to the drawings, and in particular to FIG. 1, these teachings generally encompass a process 10 that provides 11 a secure communication link between a movable barrier operator and a peripheral alarm system. The secure communication link generally comprises a monitoring resistant pathway such as, but not limited to, an encrypted wireless communication link (based, for example, on a radio frequency or light frequency carrier), a non-wireless communication link (such as, for example, an electrical or optical signal conduit) and so forth.

Certain approaches to securing such a communication path are set forth in a co-owned patent application bearing Ser. No. 11/044,411, now U.S. Pat. No. 7,071,850, entitled METHOD AND APPARATUS TO FACILITATE TRANSMISSION OF TERNARY MOVABLE BARRIER OPERATOR INFORMATION and as filed on even date herewith, the contents of which are fully incorporated herein by this reference.

Accordingly, by one approach this communication path can comprise a rolling code-based authentication protocol. This rolling code-based authentication protocol, in turn, can employ ternary data. For example, ternary data as corresponds to a communication path endpoint can be converted into a binary format (such as corresponding pairs of binary bits) and then transmitted to a recipient platform. Such a process can achieve an encryption effect.

Depending upon the needs of a given application setting, the secure communication link can comprise a dedicated link as between the movable barrier operator and the peripheral alarm system or can be shared or multiplexed in some manner with other elements. (Those skilled in the art will recognize that additional other communication links, including either or both secure and non-secure communication links, can also be provided as between the movable barrier operator and the peripheral alarm system, if desired.)

This process 10 then generally effects 12 at least one communication as between the movable barrier operator and the peripheral alarm system using the secure communication link. This communication can be directed from the movable barrier operator to the peripheral alarm system and/or vice versa, depending upon the needs and capabilities that characterize a given application setting. Pursuant to a preferred approach this communication comprises, at least in part, data (such as status information as pertains to one or the other of the movable barrier operator and the peripheral alarm system, confirmation messages, instructions, and so forth).

Effecting 12 this communication can also comprise, in a given deployment, effecting an action at one and/or the other of the movable barrier operator and the peripheral alarm system in response to receiving and/or sourcing the at least one communication. For example, the communication itself can comprise an instruction to the movable barrier operator regarding subsequent movement of a movable barrier as is controlled, at least in part, by the movable barrier operator. In such a case, the movable barrier operator may then respond to receipt of this instruction with a compliant action to cause the movable barrier to move as instructed. As another example, the peripheral alarm system may effect a given action as a function, at least in part, of receiving data from the movable barrier operator.

So configured, a movable barrier operator and a peripheral alarm system are able to communicate with one another with respect to information that may be useful to their relative operating strategies and/or with respect to specific instructions that one element can usefully execute to benefit or otherwise match or supplement the operations of the opposing element.

Figure 2:
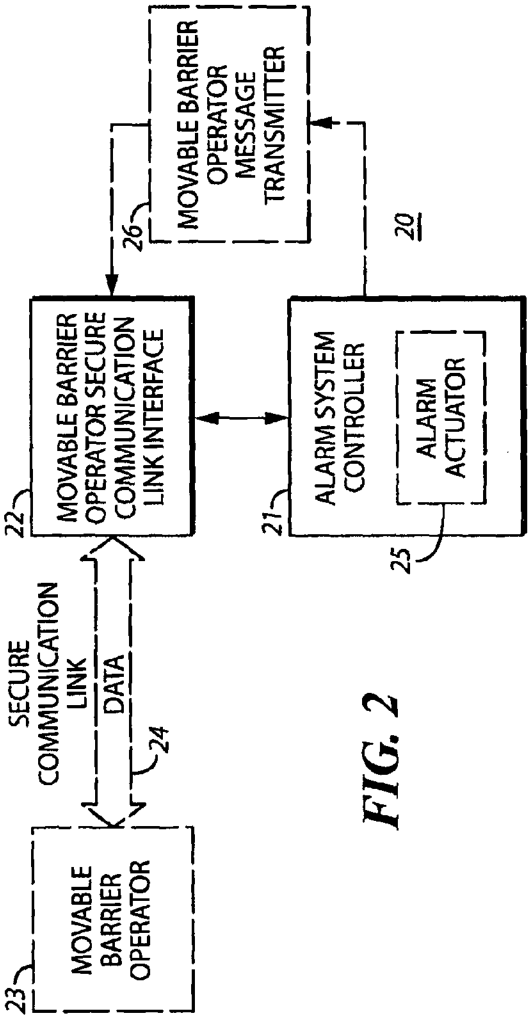
FIG. 2 comprises a block diagram as configured in accordance with various embodiments of the invention.

There are various ways to effect the above-described process 10. An illustrative example will now be set forth with reference to FIG. 2.

In this illustrative embodiment, an alarm control system 20 comprises an alarm system controller 21 that serves to generally receive data (regarding, for example, a monitored premises), to process that data with respect to various rules and tests, and to provide alarms and other actions in accordance with a given operating strategy. Such alarm system controllers 21 are generally well understood in the art. In addition, these teachings are not especially sensitive to the selection or use of any particular alarm system controller. Therefore, further elaboration will not be provided here for the sake of brevity and the preservation of narrative focus aside from noting that such alarm system controllers 21 are often partially or wholly programmable and can therefore be readily programmed to operate as described herein.

In this illustrative embodiment the alarm system controller 21 operably couples to a movable barrier operator secure communication link interface 22. The latter, in turn, comprises the interface that effects compatible interaction with a corresponding movable barrier operator 23 via a given secure communication link 24. So configured, the alarm system controller 21 is able to receive data from the movable barrier operator 23 via the secure communication link 24. As per these teachings, the alarm system controller 21 is then able to respond in some appropriate way to such received data.

In a preferred approach, the alarm system controller 21 comprises, in part, an alarm actuator 25. This alarm actuator 25, in a preferred embodiment, has a corresponding actuation time delay and serves, for example, to delay the arming of the alarm system in order to permit an authorized user to leave their house without fear that an alarm will sound upon detecting the opening of the egress door. In such a case (i.e., when the alarm actuator 25 comprises at least in part an alarm arming actuator), the operation of the alarm actuator 25 can be modified appropriately in response to receipt of information from a corresponding movable barrier operator. For example, arming of the alarm system can be delayed longer than is usual upon being advised by the movable barrier operator that the movable barrier operator's movable barrier (such as a garage door) has been opened but not yet closed (which may indicate, for example, that the authorized user has not yet completely left the premises).

As another example, when the alarm actuator 25 comprises an alarm disarming actuator (to automatically disarm the alarm system when it is otherwise armed), information received from the movable barrier operator can again be used to influence and inform this disarming functionality. To illustrate, when the movable barrier operator receives a remote control signal comprising an instruction to open the movable barrier, this information can be passed to the alarm system controller 21 as per these teachings and then used to trigger a full or temporary disarming of the alarm system in anticipation of the arrival of an authorized user.

Such actions can vary with the needs and requirements of a given application and can also vary with the substantive content of the conveyed information. Similarly, the precise information conveyed can vary with the needs and requirements of a given setting. Some illustrative examples include, but are certainly not limited to:

reception of a remotely sourced movable barrier operator command signal;

a current position of a movable barrier;

initiation of movement of the movable barrier;

current movement of the movable barrier;

cessation of movement of the movable barrier;

reversal of movement of the movable barrier;

detection of an obstacle in a pathway of the movable barrier; and unauthorized movement of the movable barrier;

to name a few.

As noted above, it may be useful in some settings for the alarm system controller 21 to itself convey information to a movable barrier operator (to permit, for example, providing a specific instruction to the movable barrier operator such as an instruction to illuminate one or more lights, to move the movable barrier to a particular position, to maintain a present position of the movable barrier, and so forth). In such a case a movable barrier operator message transmitter 26 can be provided to effect such transmissions. (Those skilled in the art will recognize and appreciate that such functionality can comprise stand-alone capability (as suggested by the illustration) or can be integrated with other elements of the alarm system such as the alarm system controller 21 and/or the movable barrier operator secure communication link interface 22.)

Figure 3:
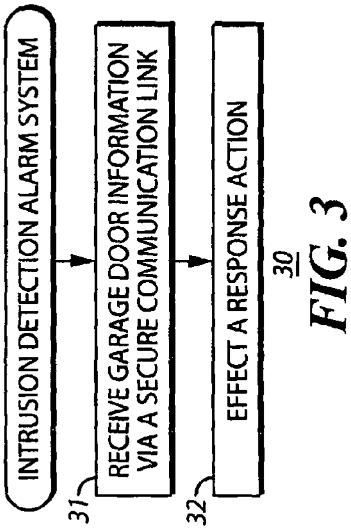
FIG. 3 comprises a flow diagram as configured in accordance with various embodiments of the invention.

Referring now to FIG. 3, and pursuant to a preferred though optional approach, an intrusion detection alarm system is preferably configured and programmed 30 to, upon receiving 31, via a secure communication link, information regarding at least one of an operational status and received operational commands as corresponds to a movable barrier operator (such as, for example, a garage door opener), by automatically effecting 32 at least one responsive action (such as an action that corresponds to at least one of arming and disarming an intrusion detection alarm). As one illustrative example, some movable barrier operators are able to detect an unauthorized opening of a movable barrier (in some cases, such a movable barrier operator is then further configured to oppose that opening movement of the movable barrier by using a motor to drive the movable barrier back to a predetermined position (such as a fully closed position)). Pursuant to these teachings, such a movable barrier operator could also, upon detecting an unauthorized opening of a movable barrier, provide a corresponding signal to a peripheral alarm system. The latter could then, for example, respond by sounding an alarm, illuminating one or more lights, transmitting an automated request for assistance, or the like.

Pursuant to one approach, the effected action can comprise, at least in part, the transmission of an external communication (such as, but not limited to, a command to the garage door opener, an inquiry to the garage door opener, a command to a peripheral alert mechanism, a message (intended, for example, for an authorized or unauthorized user of the movable barrier operator), to name a few).

Pursuant to these teachings, a movable barrier operator and a peripheral alarm system are able to securely communicate with one another. This security, in turn, permits each to rely upon the communications of the other. For example, the peripheral alarm system can rely upon status information from the movable barrier operator and take actions such as disarming its alarm capability with reduced concern that this action may be inappropriate. As another example, the movable barrier operator can rely upon specific operational instructions as may be provided by the peripheral alarm system and take actions that are otherwise contrary to its operating strategy. This, in turn, permits various useful opportunities to leverage the respective capabilities and information sources of both such elements in a way that supplements and benefits one, the other, or both.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:

a movable barrier operator responsive to signals from a remotely located user interface; and a secure encrypted communication link interface operatively connected between the movable barrier operator and a peripheral alarm system;

wherein the movable barrier operator is configured to:

control movement of a movable barrier in response to signals from the remotely located user interface, use the secure encrypted communication link interface to receive from the peripheral alarm system at least one signal representative of an encrypted information communication comprising, at least in part, a movable barrier movement command, and perform a movable barrier operator action in response to receiving the signal representative of the at least one encrypted information communication from the peripheral alarm system.

2. The apparatus of claim 1 wherein the movable barrier movement command comprises at least one of:

a command to move the movable barrier to a particular position;

a command to maintain a present position of the movable barrier;

a command to take an action that is otherwise contrary to the moveable barrier operator's operating strategy;

a command to control at least one light associated with the movable barrier operator.

3. The apparatus of claim 1 wherein the at least one encrypted information communication comprises, at least in part, an ambient light-state command.

4. The apparatus of claim 1 wherein the movable barrier operator is configured to effect at least one signal representative of an encrypted information communication from the movable barrier operator to the peripheral alarm system using the secure encrypted communication link interface, wherein the encrypted information comprises, at least in part, status information regarding a positional state of the movable barrier.

5. The apparatus of claim 4 wherein the movable barrier operator status information comprises, at least in part, information regarding detection of attempted movement of the movable barrier.

6. The apparatus of claim 1 wherein the secure encrypted communication link interface is configured to communicate through a secure encrypted communication link that employs a rolling code-based authentication protocol.

7. The apparatus of claim 6 wherein the rolling code-based authentication protocol employs ternary data.

8. An apparatus comprising:

a movable barrier operator configured to be responsive to signals from a remotely located user interface and to control movement of a movable barrier in response to signals from the remotely located user interface; and a peripheral alarm system;

a secure encrypted communication link interface operatively connected between the movable barrier operator and the peripheral alarm system;

wherein the movable barrier operator is configured to effect at least one signal representative of an encrypted information communication from the movable barrier operator to the peripheral alarm system using the secure encrypted communication link, wherein the encrypted information comprises, at least in part, status information regarding a positional state of the movable barrier, the at least one signal originating from the moveable barrier operator; and wherein the peripheral alarm system is configured to performing a peripheral alarm system action in response to the peripheral alarm system receiving the signal representative of the at least one encrypted information communication from the moveable barrier operator.

9. The apparatus of claim 8 wherein the peripheral alarm system action comprises an action regarding a system enablement state of the peripheral alarm system.

10. The apparatus of claim 8 wherein the peripheral alarm system action comprises an action regarding providing an alarm.

11. The apparatus of claim 8 wherein the movable barrier operator status information comprises, at least in part, information regarding detection of attempted movement of the movable barrier.

12. The apparatus of claim 8 wherein the secure encrypted communication link interface is configured to communicate through a secure encrypted communication link that employs a rolling code-based authentication protocol.

13. The apparatus of claim 12 wherein the rolling code-based authentication protocol employs ternary data.

14. The apparatus of claim 8 wherein the movable barrier operator is configured to:

use the secure encrypted communication link interface to receive from the peripheral alarm system at least one signal representative of an encrypted information communication comprising, at least in part, a movable barrier movement command; and perform a movable barrier operator action in response to receiving the signal representative of the at least one encrypted information communication from the peripheral alarm system.

15. The apparatus of claim 14 wherein the movable barrier movement command comprises at least one of:

a command to move the movable barrier to a particular position;

a command to maintain a present position of the movable barrier;

a command to take an action that is otherwise contrary to the moveable barrier operator's operating strategy;

a command to control at least one light associated with the movable barrier operator.

16. The apparatus of claim 14 wherein the at least one encrypted information communication comprises, at least in part, an ambient light-state command.

17. An apparatus comprising:

an alarm system peripheral to a movable barrier operator; and a secure encrypted link interface operatively connected between the alarm system and the movable barrier operator;

wherein the alarm system is configured to:

receive from the movable barrier operator at least one encrypted information communication using the secure encrypted communication link, wherein the encrypted information comprises, at least in part, movable barrier operator status information; and perform a peripheral alarm system action in response to receiving the at least one encrypted information communication from the movable barrier operator.

18. The apparatus of claim 17 wherein the peripheral alarm system action comprises an action regarding a system enablement state of the peripheral alarm system.

19. The apparatus of claim 17 wherein the peripheral alarm system action comprises an action regarding providing an alarm.

20. The apparatus of claim 17 wherein the movable barrier operator status information comprises, at least in part, information regarding detection of attempted movement of the movable barrier.

21. The apparatus of claim 17 wherein the alarm system is configured to send via the secure encrypted link interface at least one signal representative of an encrypted information communication comprising, at least in part, a movable barrier movement command.

22. The apparatus of claim 21 wherein the movable barrier movement command comprises at least one of:

a command to move the movable barrier to a particular position;

a command to maintain a present position of the movable barrier;

a command to take an action that is otherwise contrary to the moveable barrier operator's operating strategy;

a command to control at least one light associated with the movable barrier operator.

23. The apparatus of claim 21 wherein the at least one encrypted information communication comprises, at least in part, an ambient light-state command.

24. The apparatus of claim 17 wherein the secure encrypted communication link interface is configured to communicate through a secure encrypted communication link that employs a rolling code-based authentication protocol.

25. The apparatus of claim 24 wherein the rolling code-based authentication protocol employs ternary data.

* * * * *

UNITED STATES PATENT AND TRADEMARK OFFICE

CERTIFICATE OF CORRECTION

PATENT NO. : 8,144,011 B2
APPLICATION NO. : 12/967505
DATED : March 27, 2012
INVENTOR(S) : James J. Fitzgibbon It is certified that error appears in the above-identified patent and that said Letters Patent is hereby corrected as shown below:

ON THE TITLE PAGE:

In Section (57) Abstract, Line 2 -- Change "bather" to -- barrier --.

Signed and Sealed this
Twenty-fourth Day of July, 2012

David J. Kappos
*Director of the United States Patent and Trademark Office*

Disclaimer

8,144,011 B2 — James J. Fitzgibbon, Batavia, IL (US). ALARM SYSTEM INTERACTION WITH A MOVABLE BARRIER OPERATOR METHOD AND APPARATUS. Patent dated March 27, 2012. Disclaimer filed July 3, 2014, by the assignee, The Chamberlain Group, Inc.

The term of this patent shall not extend beyond the expiration date of Patent No. 7,876,218.

*(Official Gazette, August 19, 2014)*